US007280742B2

(12) United States Patent
Kim et al.

(10) Patent No.: US 7,280,742 B2
(45) Date of Patent: Oct. 9, 2007

(54) METHOD FOR RECORDING AUDIO DATA ON A REWRITABLE RECORDING MEDIUM AND FOR ADJUSTING DATA GROUPING CRITERION

(75) Inventors: Hyung Sun Kim, Seoul (KR); Kang Soo Seo, Anyang (KR); Byung Jin Kim, Seongnam (KR); Jea Yong Yoo, Seoul (KR); Soung Hyun Um, Anyang (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 09/958,574

(22) PCT Filed: Feb. 10, 2001

(86) PCT No.: PCT/KR01/00197

§ 371 (c)(1),
(2), (4) Date: Dec. 11, 2001

(87) PCT Pub. No.: WO01/59784

PCT Pub. Date: Aug. 16, 2001

(65) Prior Publication Data

US 2002/0159348 A1 Oct. 31, 2002

(30) Foreign Application Priority Data

Feb. 11, 2000 (KR) .................. 10-2000-0006534
Feb. 26, 2000 (KR) .................. 10-2000-0009665

(51) Int. Cl.
*H04N 7/52* (2006.01)
(52) U.S. Cl. .................. 386/96; 386/126; 369/59.25
(58) Field of Classification Search ............ 369/53.31, 369/53.1, 53.21; 386/128, 96, 104, 105, 386/126; G11B 7/00; H04N 5/85
See application file for complete search history.

(56) References Cited

U.S. PATENT DOCUMENTS

| 4,545,044 | A | * | 10/1985 | Satoh et al. ............. 369/30.09 |
| 4,631,723 | A | | 12/1986 | Rathbun et al. |
| 4,852,102 | A | * | 7/1989 | Yamaguchi ................. 714/701 |
| 4,996,678 | A | | 2/1991 | Maeda |
| 5,343,452 | A | * | 8/1994 | Maeda et al. ............. 369/59.26 |
| 5,453,967 | A | * | 9/1995 | Aramaki et al. ......... 369/47.11 |
| 5,504,759 | A | * | 4/1996 | Inoue et al. ................ 714/755 |
| 5,687,144 | A | * | 11/1997 | Nishizawa ............... 369/30.27 |
| 5,694,381 | A | * | 12/1997 | Sako ....................... 369/47.12 |
| 5,923,869 | A | * | 7/1999 | Kashiwagi et al. ......... 713/501 |
| 6,163,317 | A | * | 12/2000 | de Judicibus ............... 715/853 |

(Continued)

FOREIGN PATENT DOCUMENTS

EP 0 967 604 A1 12/1999

(Continued)

OTHER PUBLICATIONS

MAT (Machine assisted translation) JP 11-196372.*

*Primary Examiner*—A M Psitos
(74) *Attorney, Agent, or Firm*—Birch, Stewart, Kolasch & Birch, LLP

(57) ABSTRACT

The present invention relates to a method of writing audio data to a rewritable recording medium as grouping the written audio data into each Audio Object Unit (AOBU). This method changes AOBU grouping criterion such as time or size if a bit rate of input audio data being written to the rewritable disk is changed, and groups written audio data into each AOBU in accordance with the changed AOBU grouping criterion while recording. As a result, an amount of management information to be created for each AOBU is reduced remarkably even if the bit rate of input audio data is relatively low.

4 Claims, 7 Drawing Sheets

U.S. PATENT DOCUMENTS

| | | | |
|---|---|---|---|
| 6,192,015 B1 * | 2/2001 | Kim | 369/47.48 |
| 6,266,483 B1 * | 7/2001 | Okada et al. | 386/128 |
| 6,469,978 B1 * | 10/2002 | Ohata et al. | 369/275.3 |
| 6,636,474 B1 * | 10/2003 | Tanaka et al. | 369/275.3 |
| 6,738,561 B1 * | 5/2004 | Tanaka et al. | 386/96 |
| 6,748,160 B1 * | 6/2004 | Otomo et al. | 386/95 |
| 6,760,721 B1 * | 7/2004 | Chasen et al. | 707/3 |
| 6,795,383 B1 * | 9/2004 | Yamamoto et al. | 369/47.16 |

FOREIGN PATENT DOCUMENTS

| | | |
|---|---|---|
| EP | 000967604 A1 * | 12/1999 |
| JP | 5-2834 | 1/1993 |
| JP | 10-333984 | 12/1998 |
| JP | 11-196372 | 7/1999 |
| JP | 2000-30370 A | 1/2000 |
| WO | WO99/34601 * | 7/1999 |

* cited by examiner

METHOD FOR RECORDING AUDIO DATA ON A REWRITABLE RECORDING MEDIUM AND FOR ADJUSTING DATA GROUPING CRITERION

This application is the national phase under 35 U.S.C. § 371 of PCT International Application No. PCT/KR01/00197 which has an International filing date of Feb. 10, 2001, which designated the United States of America and was published in English.

1. TECHNICAL FIELD

The present invention relates to a method of writing audio data to a rewritable recording medium by grouping the written audio data into each audio object unit according to certain criteria.

2. BACKGROUND ART

A disk-type recording medium such as a Compact Disk (CD) can store high-quality digital audio data permanently, so that it is a popular recording medium. Recently, a Digital Versatile Disk (called 'DVD' hereinafter) has been developed as a new disk-type recording medium. A DVD can store much larger size than a CD, such that high-quality moving pictures or audio data are recorded in a DVD for a longer time. Therefore, a DVD will be used widely in the near future.

There are three types in a DVD, DVD-ROM for read-only, DVD-R for write-once, and DVD-RAM or DVD-RW for rewritable. For a rewritable DVD, the standardization of data writing format is in progress.

A disk recording apparatus records an input audio signal to the high-capacity rewritable disk through the following operations. At first, the disk recording apparatus samples at fixed rate an analog audio signal received from an external source. The sampled digital data are encoded into compressed audio data which are converted to EFM binary signals suitable for being written onto the rewritable disk. The converted binary signals are written along a spiral track of the rewritable disk, and the written data are grouped into an 'Audio Object' (called 'AOB hereinafter'). The disk recording apparatus creates navigation data for using when searching the written AOB and also writes the navigation data in an appropriate area of the rewritable disk. The navigation data are generated for every creation of an AOB.

An AOB is composed of a plurality of Audio Object Units (called 'AOBU's hereinafter). Information regarding the plurality of AOBUs is written in an audio manager information field for the AOB.

Data streams received for a fixed time, for example, 1 second may be grouped into a single AOBU. In case that data streams are received at variable bit rate, the size of each AOBU becomes different from each other if an AOBU groups the written data every 1 second. Therefore, each size information of AOBUs should be written in the audio manager information field allocated for the AOB composed of these AOBUs.

If the input (or writing) bit rate of an audio data stream is very low, the amount of data written during 1 second is much small; however, the received data are grouped into a single AOBU in spite of its small size. Therefore, the number of AOBUs is increased remarkably, which brings about large amount of management information for many AOBUs. The increment of management information reduces a recordable area for real audio data streams.

An AOBU is composed of a plurality of packs whose size is not the exact multiple of an audio frame containing the audio data stream, so that a single audio frame is divided and written in two packs if the remaining area of a pack is smaller than the size of an audio frame. However, an audio frame is not divided at the last pack of an AOBU even though the remaining area of the last pack is insufficient. At this time, the remaining area of the last pack is left unwritten without writing valid data.

Therefore, in case that input data streams are recorded at constant bit rate and data streams received for a fixed time are grouped into a single AOBU, there arise relatively many AOBUs if the input (or writing) bit rate is very low. As a result, the unwritten areas arisen at every last pack of AOBUs are increased remarkably. The increment of unwritten areas reduces a substantial recordable area allocated for real audio data streams.

3. SUMMARY OF INVENTION

It is an object of the present invention to provide a method of grouping audio data into each AOBU, which can increase data recording efficiency when writing input audio data to a rewritable recording medium.

An audio data recording method according to the present invention, while recording input audio data to a rewritable disk, checks various current recording conditions of the input audio data, changes AOBU grouping criterion based on the current recording conditions, and groups recorded audio data into each AOBU in accordance with the changed grouping criterion.

The audio data recording method according to the present invention minimizes management information which should be created for each AOBU, and reduces useless areas in which valid audio data are not written, thereby increasing recording efficiency of a rewritable disk.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

5. DESCRIPTION OF THE PREFERRED EMBODIMENTS

In order that the invention may be fully understood, a preferred embodiment(s) thereof will now be described with reference to the accompanying drawings.

Figure 1:
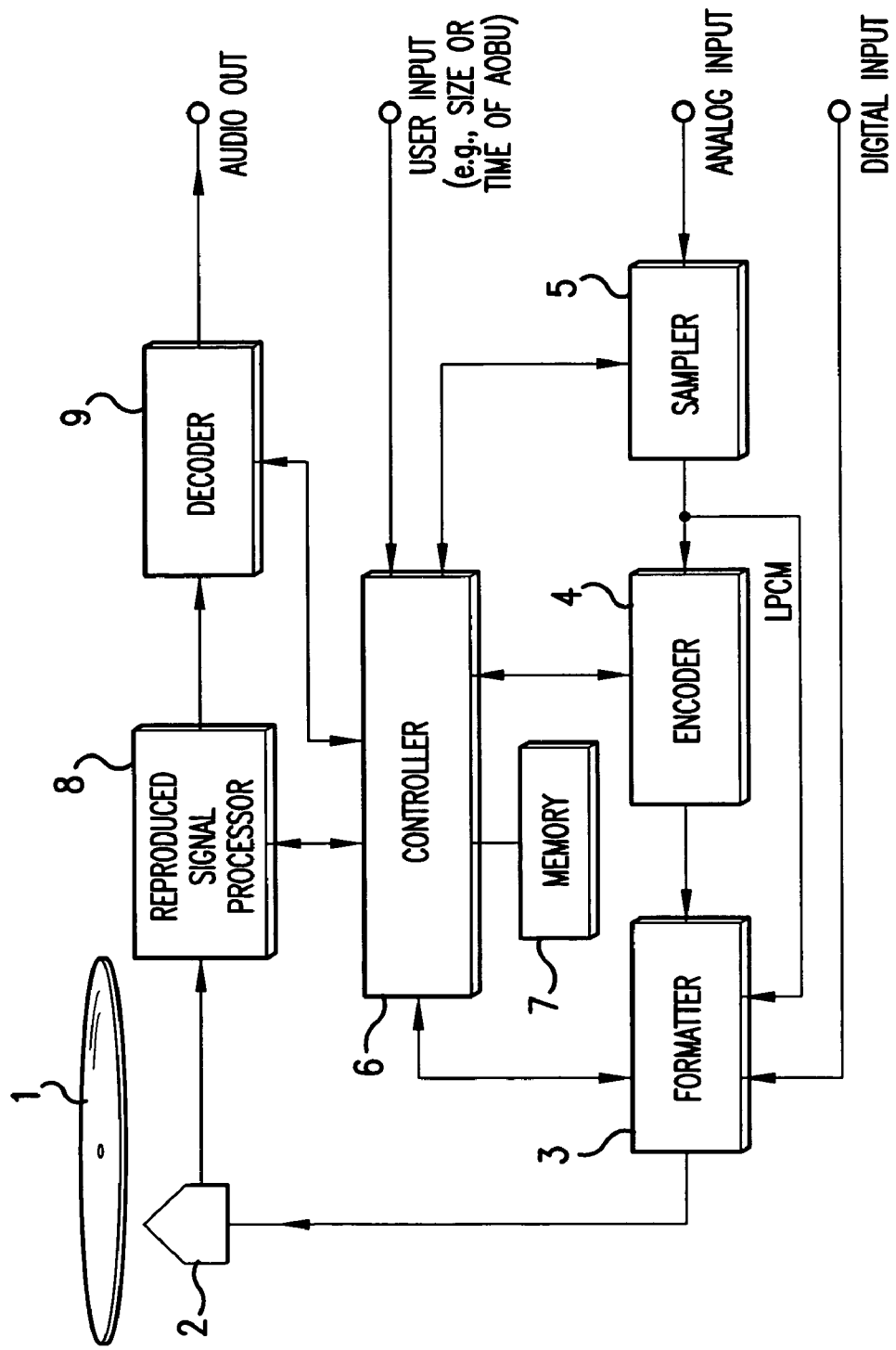
FIG. 1 is a block diagram of an optical disk device to which an audio data recording method according to the present invention is applicable.

FIG. 1 is a block diagram of an optical disk device to which an audio data recording method according to the present invention is applicable.

The disk device configured as shown in FIG. 1 comprises an optical pickup 2 reading a signal recorded in a rewritable DVD 1 and writing data streams processed into writable signals on the rewritable DVD 1; a reproduced signal processor 8 restoring the read signal into compressed digital data; a decoder 9 decoding the compressed digital data into original data; a sampler 5 digitizing an inputted analog signal into LPCM data at a preset sampling rate; an encoder 4 encoding the digitized LPCM data into MPEG-, or AC3-formatted data; a data formatter 3 converting encoded data from the encoder 4 or LPCM data from the sampler 5 into signals suitable to be written; a controller 6 controlling all elements to conduct a user's command such as playback or record; and a memory 7 for storing data temporally. All the components of the optical disc device are operatively coupled.

The disk device of FIG. 1 records to a rewritable disk an analog audio signal such as human voice, data of an audio file such as MP3 file received from a CD or a DVD, if a copy command is requested, or a television broadcast signal.

An audio data recording method conducted by the disk device of FIG. 1 is explained in detail with reference to accompanying drawings.

If an analog signal is applied to the disk device of FIG. 1, the sampler 5 samples the analog signal at the preset sampling ate. Each sampled signal, which is LPCM data, is applied to the encoder 4. The encoder 4 encodes a block of sampled data into compressed data of pre-specified format, for example, MPEG or AC-3 format. The compressed data are then applied to the data formatter 3. Instead of the encoded data from the encoder 4, the LPCM data from the sampler 5 are directly applied to the data formatter 3 according to a chosen recording mode.

While the input signal is being recorded to the rewritable DVD 1 by the pickup 2, the controller 6 checks the sampling bit rate of the sampler 5, that is, the bit rate of input or output audio data to or from the encoder 4, or the encoding system with which the encoder 4 uses for compressing audio data. Based on the acquired information from the checking operation, the controller 6 groups the audio data, which are converted to respective writing pulses, written until then into a single AOBU.

According to the above grouping operation, a plurality of AOBUs 1 to m are formed on the rewritable disk from the continuously recorded audio data. The plurality of AOBUs 1 to m are outer-grouped into a single AOB #k. Then, the next recorded audio data after the AOB #k outer-grouping will be grouped into successive AOBUs of another AOB #k+1.

Figure 2:
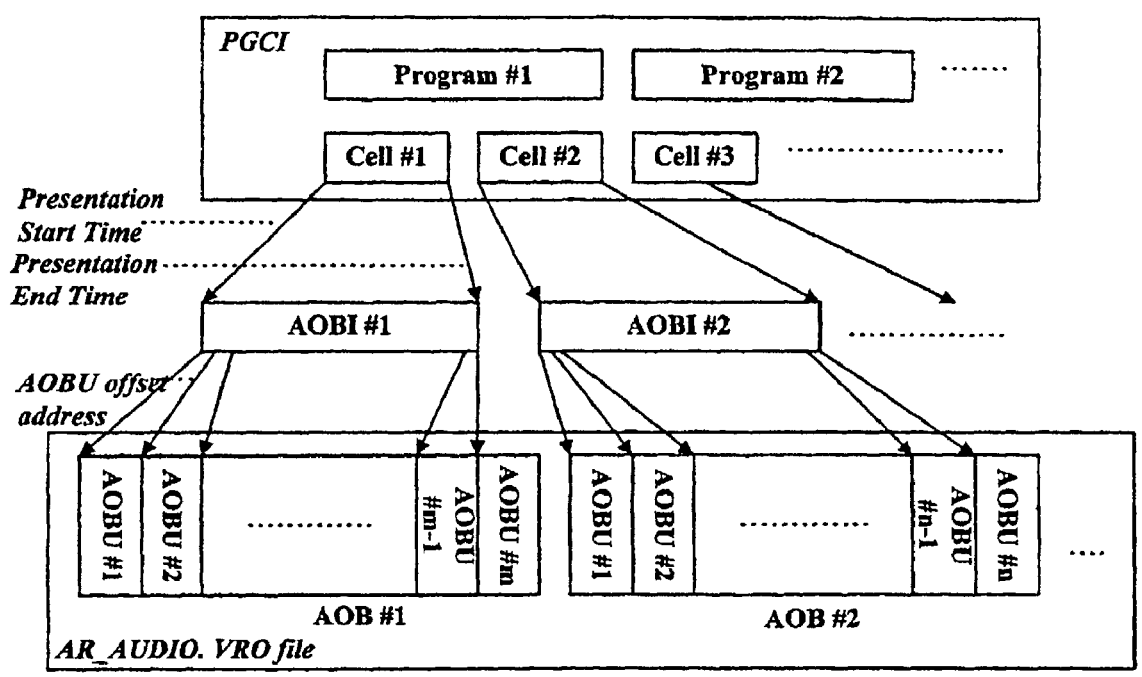
FIG. 2 shows the relationship between recorded audio data grouped into AOBUs and their management information.

In the meantime, the controller 6 creates and writes management information for each AOBU. The management information includes size information of each AOBU, and cell information in which presentation start/end time of the outer-grouped AOB is written. The cell information is written as members of the PGCI (Program Chain Information) to link the recorded AOB with a Program Chain defining reproduction order. FIG. 2 shows the relationship between recorded audio data grouped into AOBUs and their management information created as above.

As explained above, an AOBU is composed of a plurality of packs, each containing a pack header and several audio frames, and a single audio frame is divided and written in two packs if the remaining area of a current pack is not enough to contain one audio frame.

Figure 3:
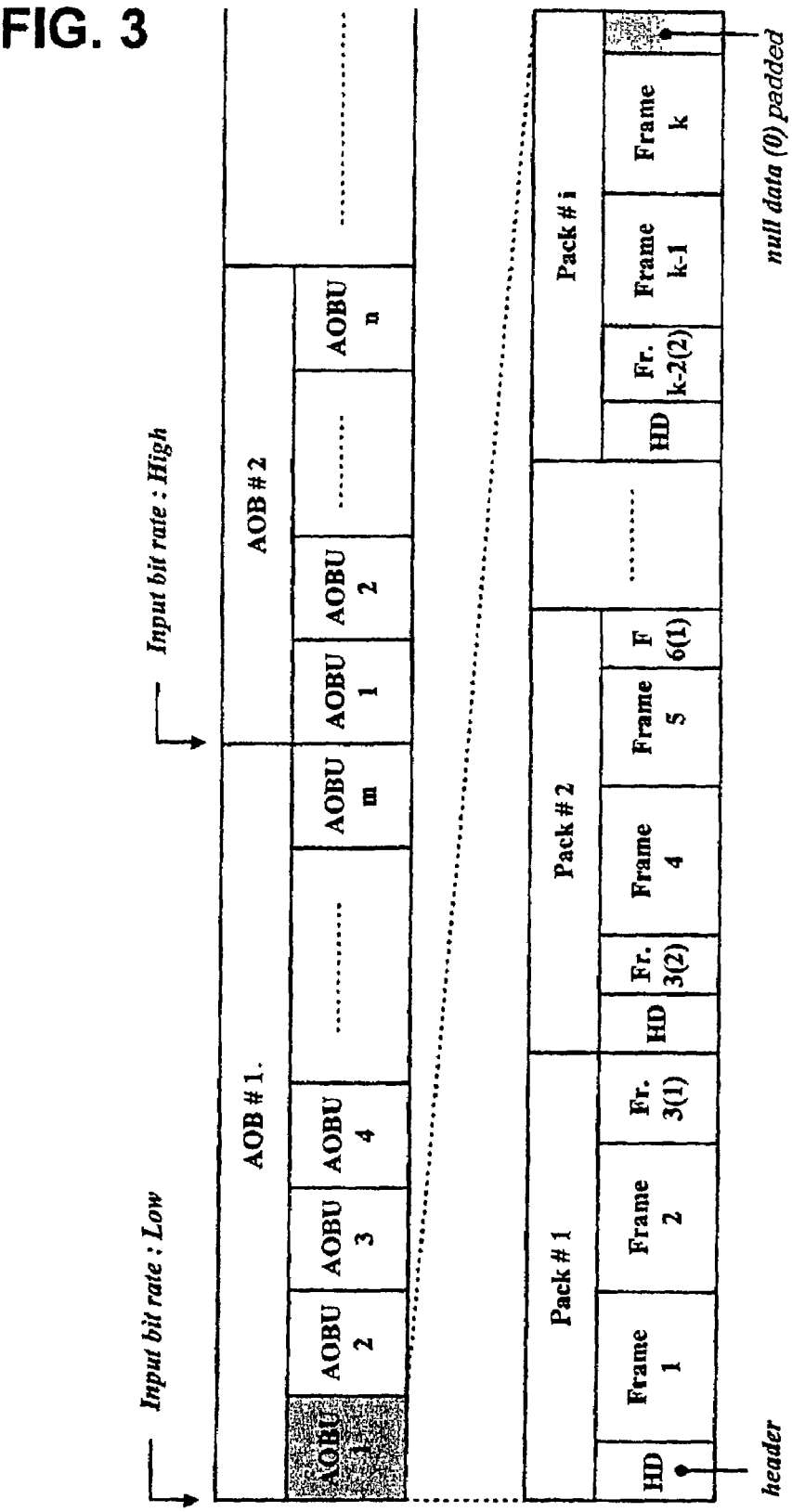
FIG. 3 shows a format example of audio data recorded according to the present invention.

FIG. 3 shows a format example of audio data recorded according to the present invention. The recording procedure resulting in the data format depicted in FIG. 3 is explained in detail below.

The controller 6 detects the bit rate of output data from the encoder 4 while recording input audio data to the rewritable DVD 1. If the detected bit rate is relatively low, for example 64 kbps, the controller 6 increases AOBU grouping time. For instance, if the AOBU grouping time has been set to 0.1 second for 384 kbps, it is reset to 0.6 (=0.1 second X 384 kbps/64 kbps) seconds for 64 kbps. The AOBU grouping time is then written as absolute time ('AOBU_TM' in FIG. 4). Instead of absolute time, a scale ratio of reset grouping time to basis time may be used. If the basis time has been defined for 384 kbps, the scale ratio to be written is 6 in the above example case.

After the reset of the AOBU grouping time to 0.6 seconds, the number of audio frames to be included in a single AOBU is increased in comparison with 0.1 second-grouping time.

If the remaining area of the last pack of an AOBU to group written audio data is not enough for a single audio frame to write, the controller 6 writes null data there and then groups the audio data written after the previous AOBU into an AOBU.

Instead of using time as the AOBU grouping criterion, the number of audio frames may be used as the AOBU grouping criterion if the size of audio frame is constant. When the number of audio frame is used as the AOBU grouping criterion, audio data are grouped into each AOBU such that the number of audio frames included in each AOBU is almost all the same.

If audio data to record are LPCM data, the controller 6 detects the bit rate of audio data directly inputted from the sampler 5 to the data formatter 3 instead of the bit rate of output data from the encoder 4, and adjusts the AOBU grouping time in proportional to the detected bit rate. If the detected bit rate is relatively low, the AOBU grouping time is adjusted to a longer time value in the same manner as aforementioned.

The AOBU grouping time adjusting process in proportional to the detected bit rate is continuously conducted by the controller 6 in the middle of recording the audio data to the rewritable disk.

On the contrary to changing the bit rate to a low bit rate, if the bit rate of output data from the sampler 5 or the encoder 4 becomes high, for example, it varies from 64 kbps to 384 kbps, in the middle of recording the input audio data, the controller 6 also resets the AOBU grouping time.

That is, the controller 6 resets the AOBU grouping time to 0.1 second from 0.6 having been set for 64 kbps. After such resetting to 0.1 second, the number of audio frames included in a single AOBU is almost equal to that of audio frames included in a single AOBU formed when the AOBU grouping time was 0.6 seconds. If the remaining area of the last pack of an AOBU to group audio data is smaller than the size of a single audio frame to write, the controller 6 writes null data there in the same manner as in the above, and then groups preceding ungrouped audio data into an AOBU.

Figure 4:
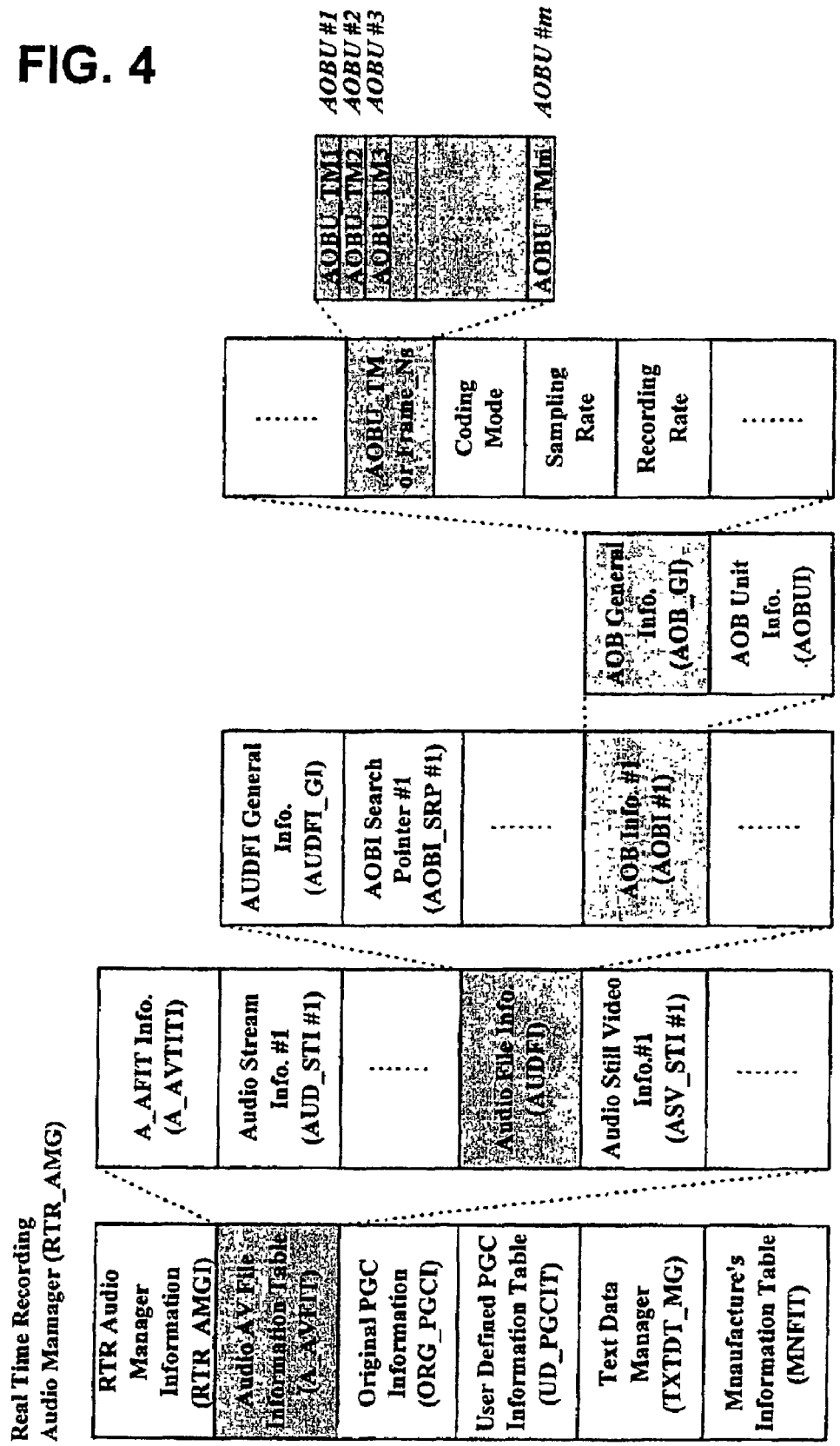
FIG. 4 depicts structure of management information for audio data recorded in a rewritable disk.

After the above recording operation is done, the controller 6 writes the information on the bit rate of output data from the sampler 5 or the encoder 4, the encoding system of the encoder 4, and the AOBU grouping time 'AOBU_TM' in the field of AOB General Information 'AOB_GI' of AOB Information 'AOBI' as shown in FIG. 4. The AOB Information is included as management information in Audio File Information 'AUDFI' of Audio A/V File Information Table 'A_AVFIT' which is a member of Real Time Recording Audio Manager 'RTR_AMG'.

Another audio data recording method according to the present invention can use an amount of management information as an AOBU grouping criterion besides the bit rate of data recording.

The remaining size of management information area of fixed size is decreased if the amount of recorded management information becomes large. Therefore, there may occur a situation that audio data can not be recorded any more because of lack of the management information area, if too much management information has been already created.

Figure 5:
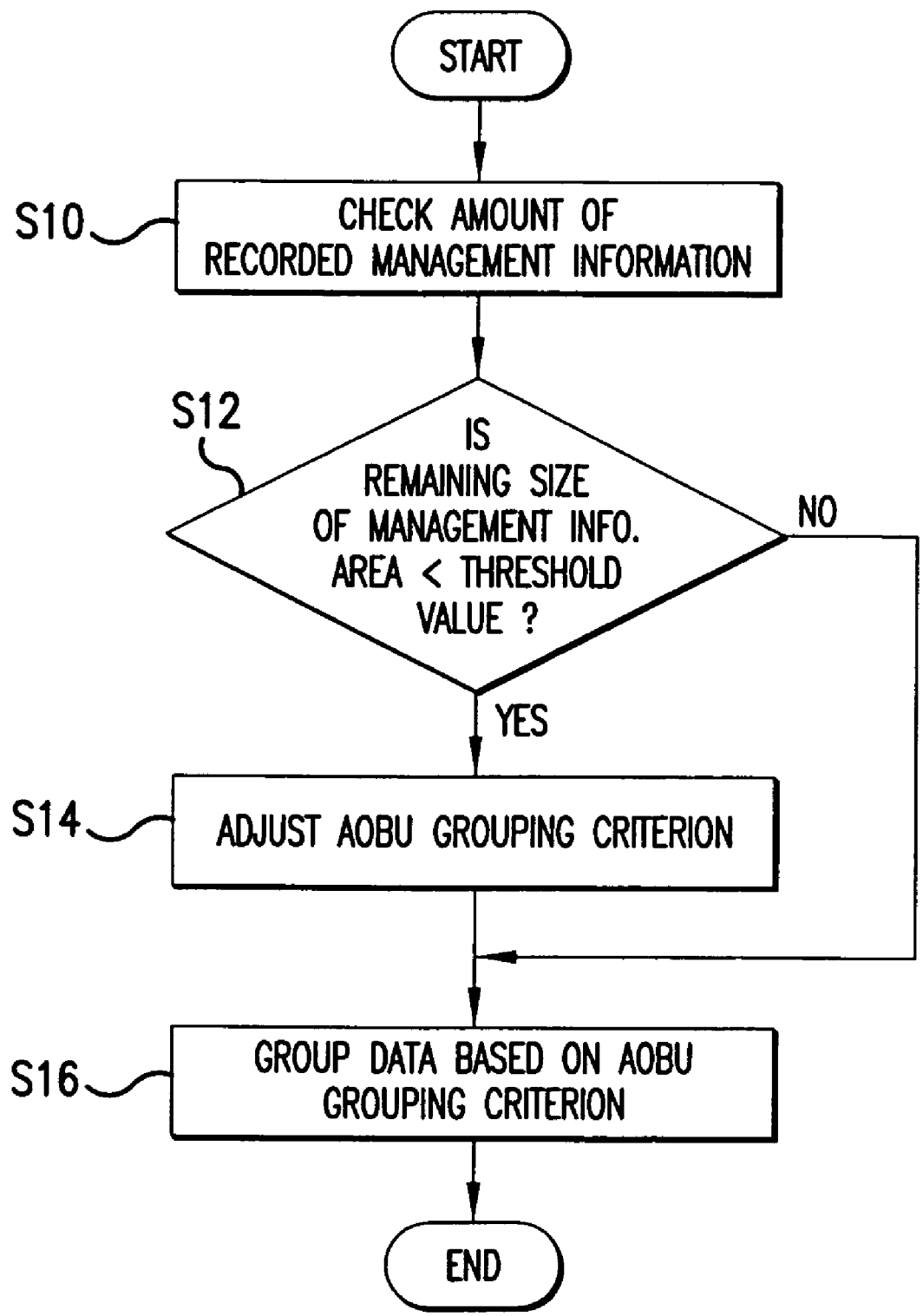
FIGS. 5-7 depict flowcharts illustrating various examples of a method of adjusting a data grouping process according to the present invention.

In this situation, even though there is large room in the rewritable disk for writing real audio data, it is impossible to record on the rewritable disk because management information for more audio data can not be written. Therefore, an AOBU size adjusting method is needed to resolve such a drawback. The method of adjusting the AOBU size in accordance with the remaining capacity of management information area is explained as follows referring to FIG. 5.

The controller 6 checks the amount of recorded management information (S10) including Program Chain Information, Cell Information, and Real Time Recording Audio Manager which are described in FIGS. 2, and 4, while recording input audio data as grouping them into each AOBU or before grouping recorded audio data into one AOBU. If the remaining size of the management information area becomes smaller than a threshold (S12) because of a large amount of recorded management information, the controller 6 adjusts AOBU grouping criterion so that each of next AOBUs may contain more audio data (S14) and performs the data grouping based on the adjusted grouping criterion (S16).

That is, the AOBU grouping criterion such as AOBU grouping time or the number of audio frames included in a single AOBU, is increased even if the bit rate of data writing is constant. The size of each AOBU, which becomes different after the increment of AOBU grouping criterion, is also written in the field of AOB General Information. If the number of audio frames ('Frame_Ns' marked in FIG. 4) is used as the size information of each AOBU, the scale ratio of the changed number to basis number may be also used. For example, if the scale ratio is 6, it means that a single AOBU contains audio frames six times as large as the basis number of audio frames.

The increment of AOBU grouping criterion relatively reduces the number of AOBUs, which results in the reduction of management information. This AOBU size adjusting method can prevent in advance the aforementioned recording impossible situation caused by the lack of management information area.

Figure 6:
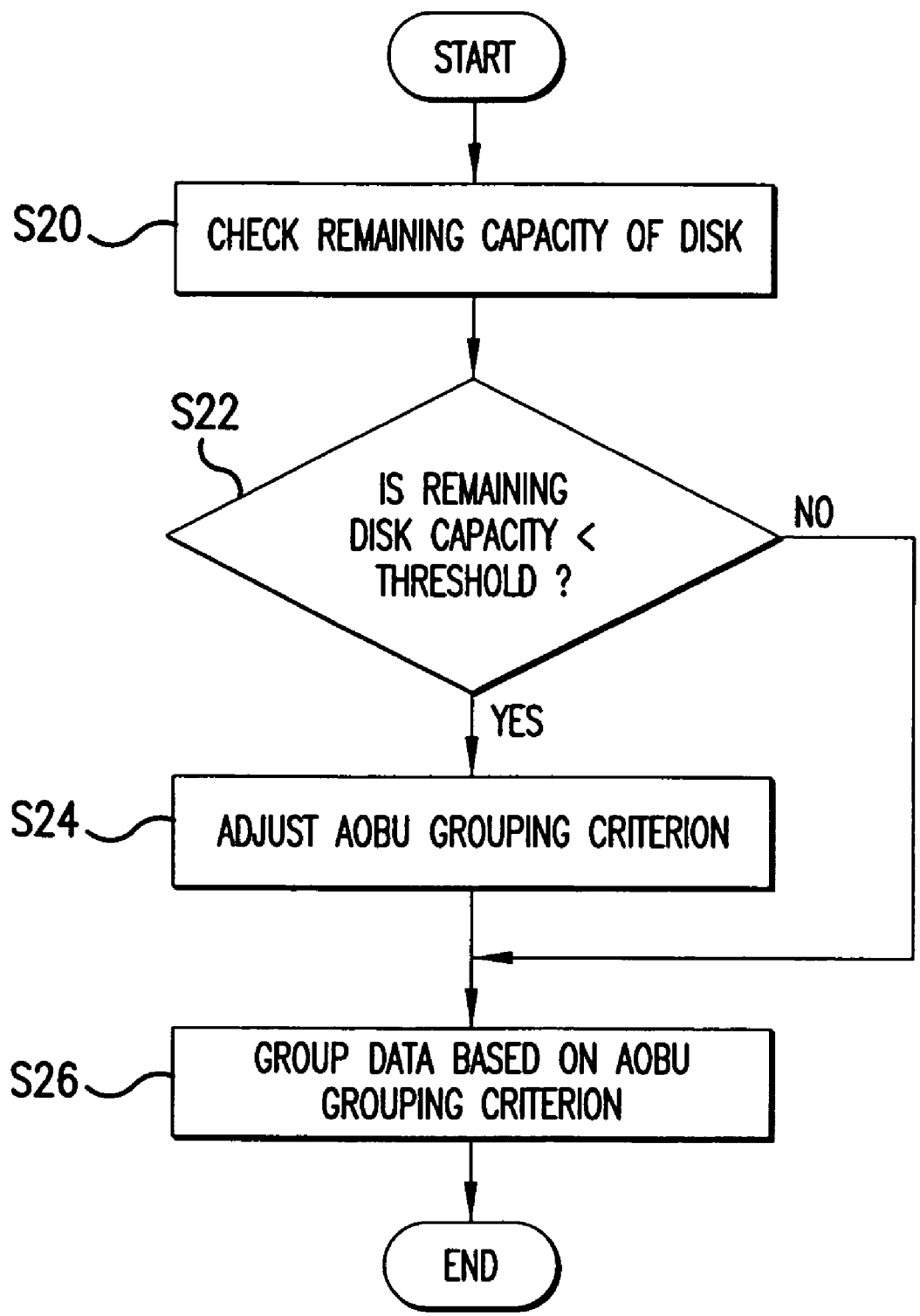

Instead of using the remaining size of the management information area, the entire remaining capacity of the rewritable disk may be used to determine how large data a single AOBU should contain. For instance, as shown in FIG. 6, the remaining capacity of the disk is checked (S20). If the remaining disk capacity is smaller than a certain threshold value (S22), then the AOBU grouping criterion is adjusted (S24) and the data grouping is performed based on the adjusted grouping criterion (S26).

The controller 6 may adjust the size of audio data to be grouped into a single AOBU according to an AOBU size defining command entered from a user. This size changing function is needed because a user sometimes wants a very long-time recording of voice regardless of the quality of recorded audio, even if it is general that a user wants high-quality recording. If this necessity occurs, the user requests the controller 6 to increase the AOBU grouping criterion regardless of all internal factors such as bit rate. According to the user's request, the controller 6 groups the recorded audio data of larger size, which is defined at the request, into each AOBU.

Therefore, the number of AOBUs is reduced as much as the grouping size is increased, which results in the reduction of management information to be created for each AOBU. Therefore, a room for audio data on the rewritable disk is relatively increased and a longer-time data recording is guaranteed.

Figure 7:
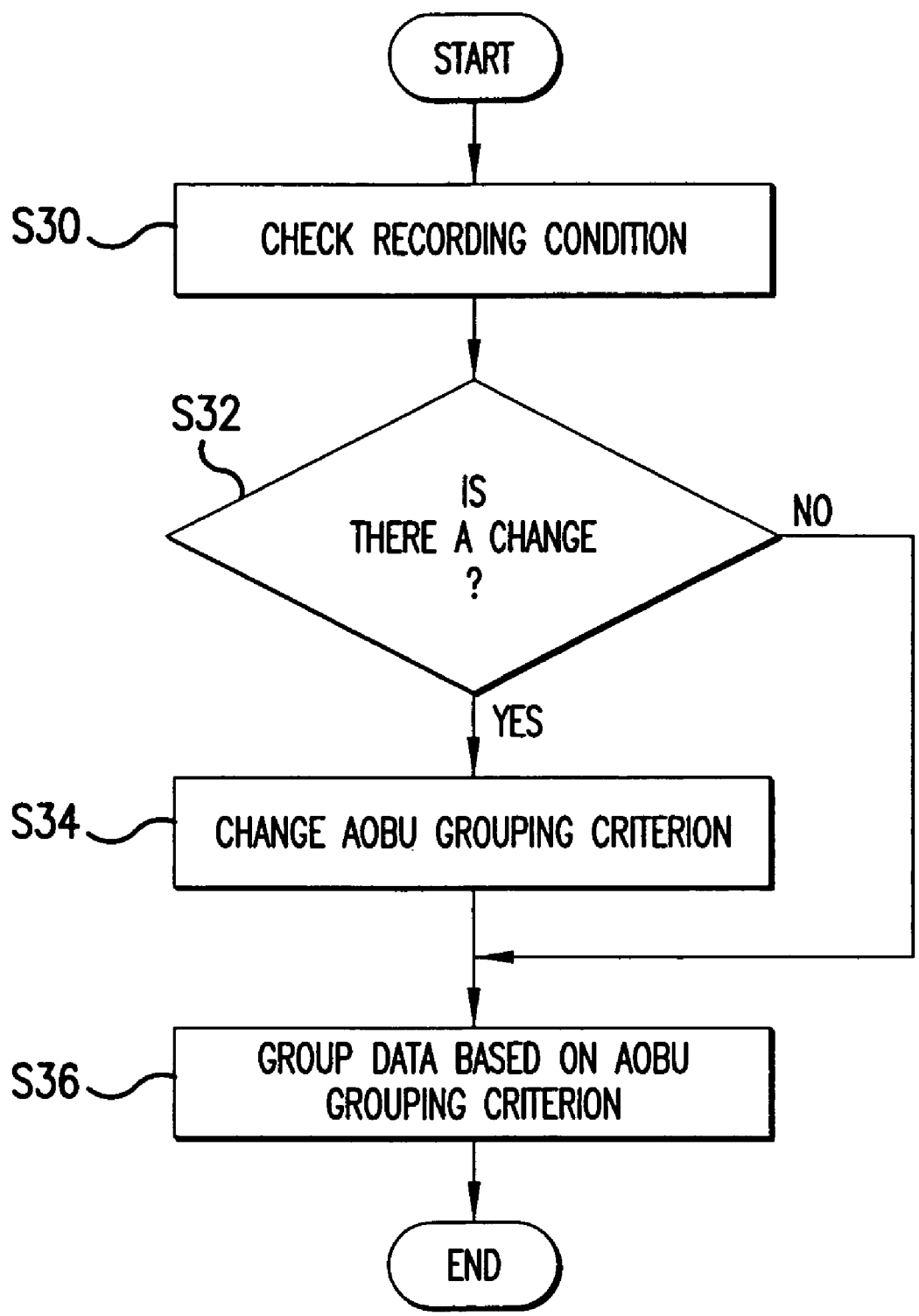

Referring to FIG. 7, according to an aspect of the invention, there is provided a method of recording audio data to a rewritable disk while grouping recorded audio data into audio object units. In this method, it is checked whether or not a recording condition for the input audio data being written to the rewritable disk is changed (S30). Then the audio object unit grouping criterion is changed (S34) if the recording condition is changed (S32), and the grouping recorded audio data are grouped into a plurality of audio object units such that the size of an audio object unit formed after the change is equal to that of an audio object unit formed before the change (S36).

The above-explained method of changing the AOBU grouping criterion of time or size according to various recording conditions, can use stored relation data between AOBU grouping criteria and various recording conditions instead of substantial calculation. That is, if the current recording condition is detected, the controller 6 searches the relation data stored in a memory for an AOBU grouping criterion specified for the detected recording condition, and replaces the current AOBU grouping criterion with the found one. After resetting the current AOBU grouping criterion to the found one, recorded audio data are grouped into each AOBU in accordance with the new AOBU grouping time or size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of recording audio data to a rewritable disk while grouping recorded audio data into audio object units, comprising the steps of:
    (a) checking whether or not a recording condition for input audio data being written to the rewritable disk is changed;
    (b) changing audio object unit grouping criterion if the recording condition is changed, and grouping recorded audio data into a plurality of audio object units such that the size of an audio object unit formed after said change is equal to that of an audio object unit formed before said change; and
    (c) writing the audio object unit grouping criterion in a management information field for an audio object outer-grouping the plurality of audio object units.

2. The method set forth in claim 1, wherein said recording condition is a bit rate at which the input audio data is written to the rewritable disk.

3. The method as set forth in claim 1, wherein the management information field is located on the rewritable disk.

4. The method as set forth in claim 1, wherein each audio object unit comprises one or more data packs, the method further comprising:
    recording one or more audio frames of the audio data the one or more data packs of the each audio object unit; and
    recording null-data to a remaining data area of a last pack of the each audio object unit if the remaining data area of the last pack is less than a space required to write a single frame of the audio data.

* * * * *